(12) United States Patent
Haddas (10) Patent No.: US 7,381,326 B2
(45) Date of Patent: Jun. 3, 2008

(54) MEGA FLOW SYSTEM

(75) Inventor: Israel Haddas, 40 Enzio Sireni St., Kfar Saba (IL)

(73) Assignee: Israel Haddas, Kfar Saba (IL)

( * ) Notice: Subject to any disclaimer, the term of this patent is extended or adjusted under 35 U.S.C. 154(b) by 71 days.

(21) Appl. No.: 10/912,143

(22) Filed: Aug. 6, 2004

(65) Prior Publication Data

US 2005/0029178 A1    Feb. 10, 2005

Related U.S. Application Data

(63) Continuation-in-part of application No. PCT/IL03/00112, filed on Feb. 13, 2003.

(60) Provisional application No. 60/359,451, filed on Feb. 15, 2002.

(51) Int. Cl.
 *A01K 63/04* (2006.01)

(52) U.S. Cl. ............... 210/167.26; 210/221.2; 119/259

(58) Field of Classification Search ............... 210/167, 210/169, 198.1, 220, 221.1, 221.2, 167.07, 210/167.21, 167.26, 167.01; 134/104.4; 261/124; 119/259, 263
See application file for complete search history.

(56) References Cited

U.S. PATENT DOCUMENTS

| | | | | |
|---|---|---|---|---|
| 1,643,273 A | * | 9/1927 | Imhoff | 210/170.02 |
| 3,462,360 A | * | 8/1969 | McKinney | 210/602 |
| 3,794,303 A | * | 2/1974 | Hirshon | 261/61 |
| 4,017,735 A | * | 4/1977 | Siegel | 250/430 |
| 4,545,945 A | * | 10/1985 | Prave et al. | 261/36.1 |
| 4,863,594 A | * | 9/1989 | Pedretti | 210/169 |
| 4,915,059 A | * | 4/1990 | Long | 119/224 |
| 4,940,545 A | * | 7/1990 | DiGregorio et al. | 210/609 |
| 4,972,801 A | * | 11/1990 | Hunt | 119/215 |
| 5,041,217 A | * | 8/1991 | Reid | 210/194 |
| 5,055,186 A | * | 10/1991 | Van Toever | 210/150 |
| 5,217,609 A | * | 6/1993 | Holdeman | 210/207 |
| 5,438,959 A | * | 8/1995 | Stone et al. | 119/248 |
| 5,450,818 A | * | 9/1995 | Caillouet | 119/223 |
| 5,494,577 A | * | 2/1996 | Rekers | 210/321.8 |
| 6,065,430 A | * | 5/2000 | Sheriff | 119/227 |
| 6,117,313 A | * | 9/2000 | Goldman et al. | 210/151 |
| 2002/0148779 A1 | * | 10/2002 | Shieh et al. | 210/605 |

FOREIGN PATENT DOCUMENTS

| | | | |
|---|---|---|---|
| EP | 0498397 | * | 8/1992 |
| GB | 2080276 | * | 2/1982 |
| JP | 62-68591 | * | 3/1987 |
| JP | P2000-229685 | * | 8/2000 |

* cited by examiner

*Primary Examiner*—Fred Prince
(74) *Attorney, Agent, or Firm*—Mark M. Friedman

(57) ABSTRACT

An aerated recirculated aquaculture system including a culture tank and an aeration and circulation system. The culture tank houses live aquaculture. The culture tank defines a first flow path. The aeration and circulation system includes an aeration device configured to aerate water. The aeration device defines a second flow path. The first flow path and second flow path at least partially defining a substantially closed flow path sequentially passing through the culture tank and the aeration device. The aeration and circulation system is configured to circulate the water around the substantially closed flow path.

20 Claims, 7 Drawing Sheets

MEGA FLOW SYSTEM

This application is a continuation-in-part of PCT Application Number IL03/00112 filed Feb. 13, 2003, now WO 03/067,966 which in turn claims priority from U.S. Provisional Application No. 60/359,451 filed Feb. 15, 2002.

FIELD AND BACKGROUND OF THE INVENTION

The present invention relates to an aquaculture system and, in particular, it concerns a system for increasing aquaculture biomass density by aeration using atmospheric air only.

By way of introduction, modem aquaculture is trying to reduce cost of operation and investment in intensive aquaculture facilities by reducing the size of the farm facilities. This is being achieved by creating a relatively small culture volume in which the reared species is cultured at high densities. Such high densities are not common in the natural environment and special means are needed to support the need for dissolved oxygen, degassing of carbon dioxide and removal of solids from the culture water.

The most wide spread solution is to use oxygen enrichment from a liquid oxygen source or from an oxygen generator. The high concentration of the source allows super saturation of oxygen and thus allows a low rate of water recirculation. In this method, high-energy input is needed to dissolve-in the oxygen, as well as to strip off the carbon dioxide created by respiration.

Other methods relying on aeration apparatus such as paddle wheels, surface agitators, and air diffusers, limit maximum bio-density. Bio-density is limited due to the narrow band available for oxygen introduction between saturation and the minimal concentration required for the well being of the reared species. Typically the minimum concentration needed is not far from saturation (1-3 parts per million difference). Bio-density is also limited due to the maximum velocity and turbulence created by such apparatus, limiting its use and creating a maximum density barrier derived from the rate of oxygen consumption and the maximum allowable speed and turbulence.

Therefore, there is a need for a system to surpass the density limitation for an aerated recirculated aquaculture system

SUMMARY OF THE INVENTION

The present invention is an aerated recirculated aquaculture system and method of operation thereof.

According to the teachings of the present invention there is provided, an aerated recirculated aquaculture system, comprising: (a) a culture tank for housing live aquaculture, the culture tank defining a first flow path; and (b) an aeration and circulation system including an aeration device configured to aerate water, the aeration device defining a second flow path, the first flow path and the second flow path at least partially defining a substantially closed flow path sequentially passing through the culture tank and the aeration device, the aeration and circulation system being configured to circulate the water around the substantially closed flow path.

According to a further feature of the present invention, the culture tank has a first section and a second section, the aeration device having a first section and a second section, the culture tank and the aeration device being configured such that, the substantially closed flow path passes through the first section of the culture tank, then through the first section of the aeration device, then through the second section of the culture tank and then through the second section of the aeration device.

According to a further feature of the present invention, the aeration device includes an airlift pump having a dispensing arrangement and a conduit, the conduit having a top opening and a bottom opening, the dispensing arrangement having a plurality of holes configured for enabling injection of air into the water causing a plurality of bubbles to form in the conduit, the holes substantially covering a majority of the dispensing arrangement, the dispensing arrangement having at least one opening configured to allow passage of the water through the dispensing arrangement, such that a majority of the water flowing in the second flow path passes through the dispensing arrangement between a majority of the holes.

According to a further feature of the present invention, the dispensing arrangement includes a porous material.

According to a further feature of the present invention, the conduit is configured to direct momentum from the upward flow of the water in the conduit into the first flow path of the culture tank.

According to a further feature of the present invention: (a) the culture tank has an internal bottom surface; and (b) at least part of the bottom opening of the conduit is disposed lower than any part of the internal bottom surface.

According to a further feature of the present invention, the conduit has a substantially rectangular cross-section.

According to a further feature of the present invention, the conduit tapers towards the top opening.

According to a further feature of the present invention, the holes are spaced substantially evenly among the dispensing arrangement.

According to a further feature of the present invention, the airlift pump includes an adjustable choke configured to regulate the rate of water flow in the conduit, thereby regulating the amount of aeration of the water.

According to a further feature of the present invention, the airlift pump includes a second air dispensing arrangement disposed externally to the conduit, the second dispensing arrangement being configured to regulate the rate of water flow in the conduit, thereby regulating the amount of aeration of the water.

According to a further feature of the present invention, there is also provided a dispensing and foam collecting arrangement disposed above the second air dispensing arrangement, the dispensing and foam collecting arrangement configured for: (a) distributing water evenly among bubbles rising from the second air dispensing arrangement; and (b) collecting foam associated with the bubbles rising from the second air dispensing arrangement.

According to a further feature of the present invention, the dispensing and foam collecting arrangement includes an array of downward facing truncated cones interspersed with an array of upward facing truncated cones.

According to a further feature of the present invention, the top opening is substantially wholly disposed below a resting level of the water within the culture tank.

According to a further feature of the present invention, there is also provided a front wing disposed adjacent to the top opening, a majority of the front wing being disposed in the culture tank below the resting level, the front wing being configured to direct momentum from the upward flow of the water in the conduit into the first flow path of the culture tank.

According to a further feature of the present invention, there is also provided vent holes disposed between the front wing and the top opening, the vent holes configured to allow escape of gas.

According to a further feature of the present invention, the culture tank has a first sloping internal bottom surface adjacent to the top opening of the conduit and a second sloping internal bottom surface, the first sloping internal bottom surface being steeper than the second sloping internal bottom surface.

According to a further feature of the present invention, there is also provided a separation arrangement disposed between the culture tank and the aeration device substantially at the end of the first flow path, the separation arrangement being configured to filter water leaving the culture tank to prevent clogging of the aeration device.

According to a further feature of the present invention, there is also provided a bottom collector having a collection opening, the culture tank having an internal bottom surface, the collection opening being disposed adjacent to the internal bottom surface such that, in operation a bottom layer of contaminated water flowing through the first flow path is removed from the culture tank via the collection opening.

According to a further feature of the present invention: (a) the bottom collector has a collection container configured for collecting the bottom layer; and (b) the bottom collector has a pumping arrangement configured to remove the bottom layer from the collection container, the pumping arrangement being configured to pump at a rate which is sufficient to ensure that the bottom layer is removed from the first flow path via the collection opening.

According to a further feature of the present invention, the collection container has an at least partially slanted bottom surface configured to cause solids to collect near to the pumping arrangement.

According to a further feature of the present invention, the pumping arrangement operates using an airlift apparatus.

According to the teachings of the present invention there is also provided an airlift pump system, comprising: (a) a conduit having a top opening and a bottom opening, the conduit defining a flow path from the bottom opening to the top opening; and (b) a dispensing arrangement having a plurality of holes configured for enabling injection of air into the water causing a plurality of bubbles to form in the conduit, the holes substantially covering a majority of the dispensing arrangement, the dispensing arrangement having at least one opening configured to allow passage of the water through the dispensing arrangement, such that a majority of the water flowing in the flow path passes through the dispensing arrangement between a majority of the holes.

According to a further feature of the present invention, the dispensing arrangement includes a porous material.

According to a further feature of the present invention, the conduit has a substantially rectangular cross-section.

According to a further feature of the present invention, the conduit tapers towards the top opening.

According to a further feature of the present invention, the holes are spaced substantially evenly among the dispensing arrangement.

According to a further feature of the present invention, there is also provided an adjustable choke configured to regulate the rate of water flow in the conduit, thereby regulating the amount of aeration of the water.

According to a further feature of the present invention, there is also provided a second air dispensing arrangement disposed externally to the conduit, the second dispensing arrangement being configured to regulate the rate of water flow in the conduit, thereby regulating the amount of aeration of the water.

According to a further feature of the present invention, there is also provided a dispensing and foam collecting arrangement disposed above the second air dispensing arrangement, the dispensing and foam collecting arrangement configured for: (a) distributing water evenly among bubbles rising from the second air dispensing arrangement; and (b) collecting foam associated with the bubbles rising from the second air dispensing arrangement.

According to a further feature of the present invention, the dispensing and foam collecting arrangement includes an array of downward facing truncated cones interspersed with an array of upward facing truncated cones.

According to the teachings of the present invention there is also provided a cleaning system for cleaning contaminated water in a tank, the tank being configured for having the water flow therein in a defined flow path, the tank having an internal bottom surface, the system comprising: (a) a collection opening disposed adjacent to the internal bottom surface of the tank configured for removing a bottom layer of contaminated water flowing through the tank; (b) a collection container for collecting the bottom layer therein; and (c) a pumping arrangement configured to remove the bottom layer from the collection container, the pumping arrangement being configured to pump at a rate which is sufficient to ensure that the bottom layer is removed from the tank via the collection opening.

According to a further feature of the present invention, the collection container has an at least partially slanted bottom surface configured to cause solids to collect near to the pumping arrangement.

According to a further feature of the present invention, the pumping arrangement operates using an airlift apparatus.

BRIEF DESCRIPTION OF THE DRAWINGS

The invention is herein described, by way of example only, with reference to the accompanying drawings, wherein:

FIG. 7b is a plan view of the aeration tank in accordance with the most preferred embodiment of FIG. 7a;

FIG. 9b is a cross-sectional view through line B-B of FIG. 9a.

DESCRIPTION OF THE PREFERRED EMBODIMENTS

The present invention is an aerated recirculated aquaculture system construction and method of operation thereof.

The principles and operation of an aerated recirculated aquaculture system according to the present invention may be better understood with reference to the drawings and the accompanying description.

Figure 1:
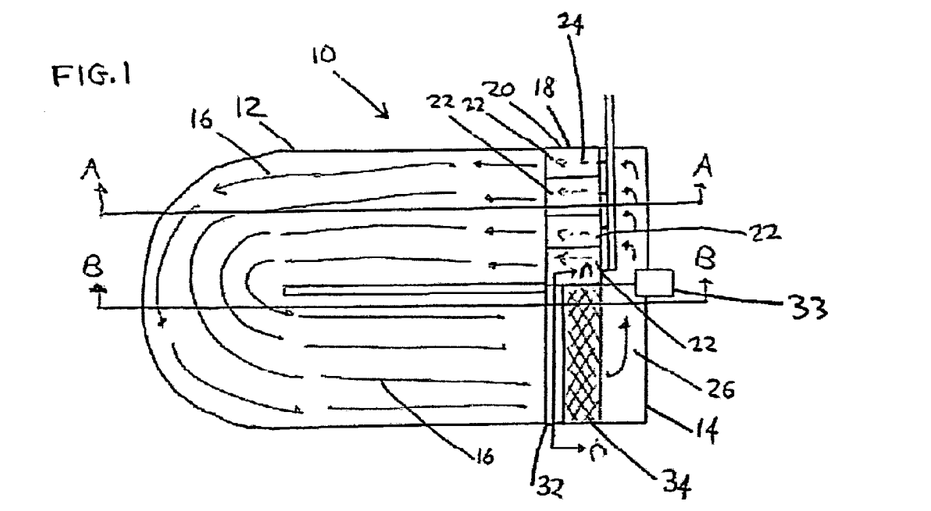
FIG. 1 is a plan view of an aerated recirculated aquaculture system that is constructed and operable in accordance with a preferred embodiment of the present invention.
Figure 2:
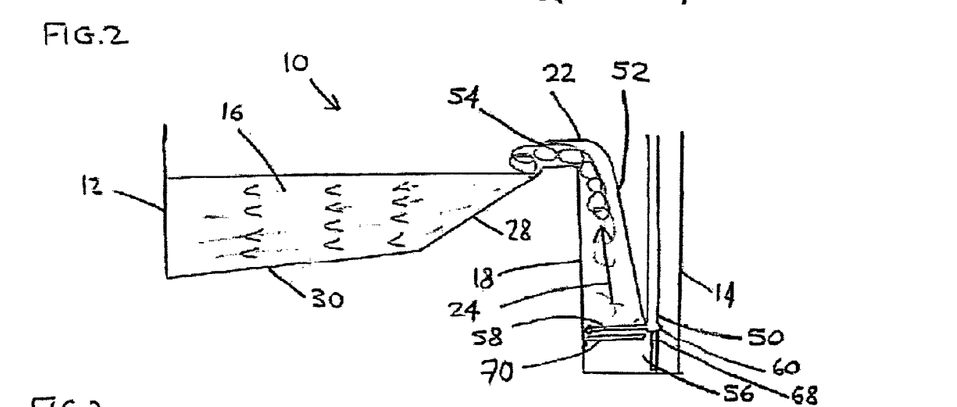
FIG. 2 is a cross-section view of the aerated recirculated aquaculture system of FIG. 1 through line A-A.
Figure 3:
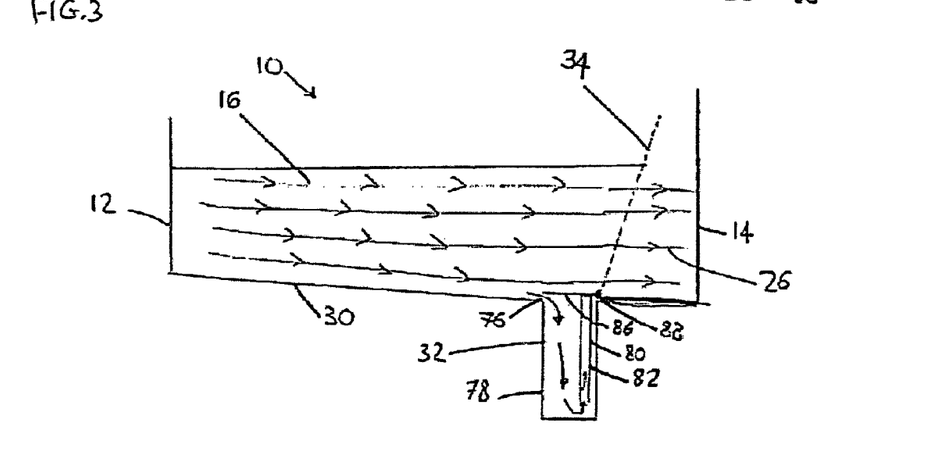
FIG. 3 is a cross-sectional view of the aerated recirculated aquaculture system of FIG. 1 through line B-B.

Reference is now made to FIGS. 1, 2 and 3. FIG. 1 is a plan view of an aerated recirculated aquaculture system 10 that is constructed and operable in accordance with a preferred embodiment of the present invention. FIG. 2 is a cross-section view of aerated recirculated aquaculture system 10 of FIG. 1 through line A-A. FIG. 3 is a cross-sectional view of aerated recirculated aquaculture system 10 of FIG. 1 through line B-B. Aerated recirculated aquaculture system 10 includes a culture tank 12 for housing aquaculture species, for example, fish and shellfish and an aeration tank 14. Culture tank 12 defines a flow path 16. Aeration tank 14 includes an aeration and circulation system 18 which includes an aeration device 20 configured to aerate the water in culture tank 12. Aeration device 20 is formed from four airlifts 22. It will be appreciated by one ordinarily skilled in the art that the number of airlifts included within aeration device 20 will depend on various design factors. It is generally possible to have a single airlift within aeration device 20. However, the division of aeration device 20 into a number of airlifts allows the operator to employ part of the battery of airlifts when the biomass is small and employ more of the airlifts as the biomass and therefore the demand for aeration grows. In this manner energy is saved because supply follows more closely the demand. Airlifts 22 aerate the water by adding oxygen and removing carbon dioxide. Aeration device 20 defines a flow path 24. Flow path 16 and flow path 24 as well as a flow path 26 which is defined by the remainder of aeration tank 14, define a substantially closed flow path sequentially passing through culture tank 12 and aeration tank 14. The closed flow path is described as "substantially closed", in that approximately 10% of the flow is removed to undergo a nitrification cycle and approximately 1% of the main flow is removed as waste solids (see reference to inspection tray 33 below). The closed flow path is described as "sequentially passing through culture tank 12 and aeration tank 14". It should be noted that no order is implied by the word "sequentially" and that the closed flow path is also described as sequentially passing through aeration tank 14 and culture tank 12. Aeration and circulation system 18 is configured to circulate the water around the substantially closed flow path. Each of airlifts 22 performs this circulation function. Airlifts 22 are described in more detail with respect to FIG. 5.

In operation, air bubbles are added to the water in airlifts 22 causing the water to rise. This "bubbly flow" is then directed into culture tank 12. At this point, the water is travelling at approximately one meter per second. However, it should be noted that the velocity of the water at this point could vary anywhere between 20 to 150 cm per second depending on the design of each airlift 22 and the number of airlifts 22 which are being used. Culture tank 12 has a sloping internal bottom surface 28 adjacent to airlifts 22 and a sloping internal bottom surface 30 in the remainder of culture tank 12. Sloping internal bottom surface 28 is steeper than sloping internal bottom surface 30. Sloping internal bottom surface 28 encourages a progressive integration of the "bubbly flow" leaving airlifts 22 into the slow flowing water in culture tank 12. The rate of flow in culture tank 12 in the region of sloping internal bottom surface 30 is typically 10 centimeters per second allowing uniform substantially laminar flow of the water. The velocity is kept at a convenient speed for the reared species. Sloping internal bottom surface 30 encourages solid waste materials to travel toward a bottom collector 32 which is disposed adjacent to sloping internal bottom surface 30 near to the end of flow path 16. Bottom collector 32 removes a bottom layer of contaminated water, containing waste materials. The contaminated water is sent for processing via an inspection tray 33 which collects the heaviest solids, such as uneaten food pellets, allowing information gathering and decision making regarding care of the aquaculture species, for example, by adjusting the feeding regime. Water and sediment are released from inspection tray 33 for further processing. A separation arrangement 34, typically a separating grill or grid is disposed between culture tank 12 and aeration tank 14, substantially at the end of flow path 16. Separation arrangement 34 is configured to filter water leaving culture tank 12 to prevent clogging of aeration device 20. Separation arrangement 34 is tilted towards aeration tank 14 to encourage any items which might block separation arrangement 34, such as dead fish, to rise to the top of separation arrangement 34, thereby enabling easy removal. The arrangement of the closed loop of culture tank 12 and aeration tank 14 ensures that the most oxygenated and degassed water is enters culture tank 12 and the least oxygenated and carbon dioxide saturated water returns to aeration tank 14. Thus, creating the highest concentration difference for the airlift operation enhancing the gas transfer efficiency of airlifts 22. As discussed above, the speed of the water flowing in culture tank 12 depends on the design of airlifts 22 as well as the number of airlifts 22 being operated. Heavy solids tend to sink fast to the bottom of culture tank 12. Therefore, the water flow rate and the slope of sloping internal bottom surface 30 need to be configured to ensure that solids do not accumulate in the quieter zones of culture tank 12. It is very important to avoid solid accumulation because solids release undesirable substances into the water. However, it will be apparent to those ordinarily skilled in the art that the speed of the water flowing in culture tank 12 will depend upon the minimum cleaning velocity needed to ensure that solids are pushed along sloping internal bottom surface 30 towards bottom collector 32 versus fish comfort and gas transfer efficiency.

Figure 4:
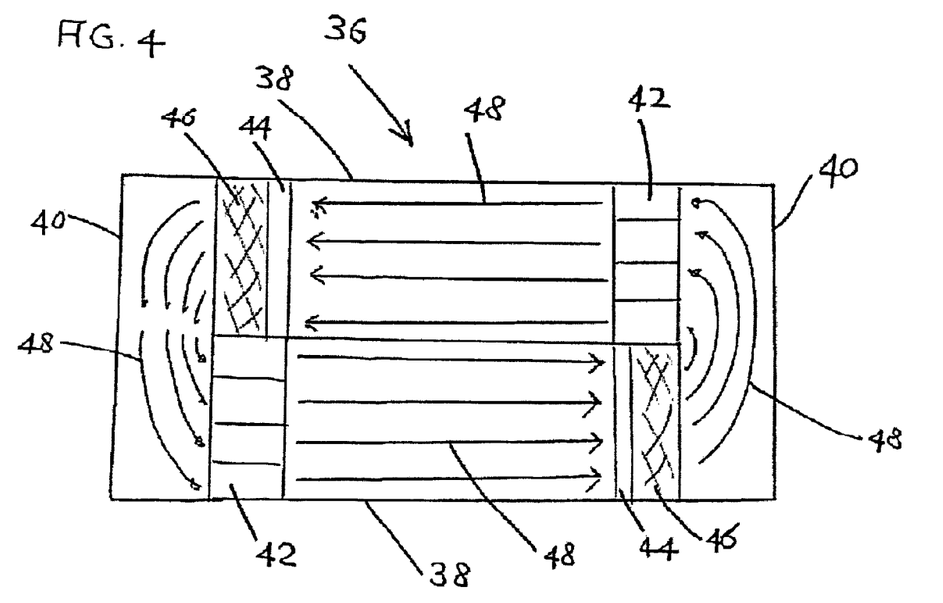
FIG. 4 is a plan view of an aerated recirculated aquaculture system that is constructed and operable in accordance with a first alternate embodiment of the present invention.

Reference is now made to FIG. 4, which is a plan view of an aerated recirculated aquaculture system 36 that is constructed and operable in accordance with a first alternate embodiment of the present invention. Aerated recirculated aquaculture system 36 includes two culture tanks 38 and two aeration tanks 40. Each aeration tank 40 includes an aeration and circulation system 42. Aerated recirculated aquaculture system 36 also includes a bottom collector 44 and a separation arrangement 46 disposed in each culture tank 38. Culture tanks 38 and aeration tanks 40 define a closed flow path 48.

Airlift 22, is a high efficiency airlift, which is a development of the well-known Airlift pump. An airlift pump uses compressed air introduced at the bottom of the pump creating a mixture of air bubbles and water, which is lighter than water. This creates the lifting effect. It has been shown by several researchers, amongst them Timmons & Reinemann, that an airlift pump is efficient as long as the gas to liquid ratio is below 25%. This creates a phenomenon called "bubbly flow". The same researchers recommend that the ratio between diameter of the pump and its length is smaller than 1:15. Since tanks in normal aquaculture facilities are rather shallow the usual airlift diameter is limited to about 3 inches, thereby limiting the output flow. The current invention is based on a high flow rate of newly aerated water through aeration tank 14. The flow provides the needed dissolved oxygen while keeping the minimum concentration above a predefined concentration. The desired flow is therefore the total oxygen flux needed divided by the concentration span available. Since a typical oxygen flux in aquaculture is a few hundred grams per ton of biomass per hour, the typical water flow needed is a few hundred cubic meters per hour per ton of biomass. Hence, the typical airlift application should have a flow capacity measured in thousands of cubic meters per hour. Such a flow rate is not practical with a conventional airlift which is typically limited to 3 inches in diameter. Many hundreds of conventional airlifts would be necessary to provide this flow rate. However, the costs of manufacturing, operating and maintaining such a large quantity of airlifts are too high to be economical in commercial aquaculture. Additionally, it is very difficult to balance their operation resulting in low efficiency. Therefore, airlifts 22 of the current invention have additional features which enable them to overcome the 1:15 ratio, thereby providing a high efficiency airlift for commercial aquaculture.

Figure 5:
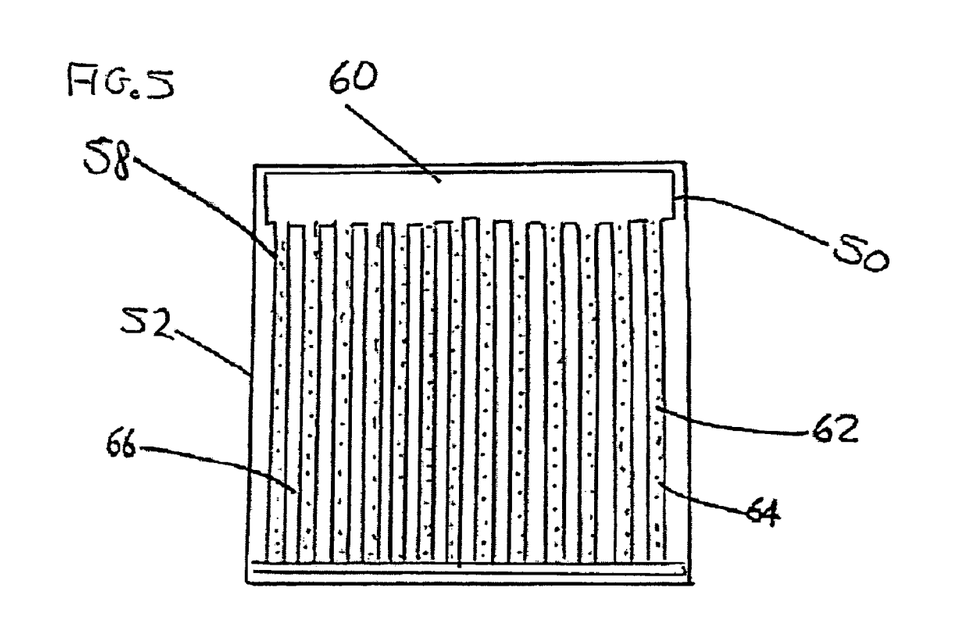
FIG. 5 is a top view of a dispensing arrangement for use with the aerated recirculated aquaculture system of FIG. 1.

Reference is again made to FIG. 2. Each airlift 22 has a dispensing arrangement 50 and a conduit 52. Conduit 52 has a top opening 54 and a bottom opening 56. Dispensing arrangement 50 is disposed within conduit 52 near to bottom opening 56 or below conduit 52 near to bottom opening 56. Reference is also made to FIG. 5, which is a top view of dispensing arrangement 50. Dispensing arrangement 50 has a dispensing grill 58, which is formed from a central airway 60 supplying compressed air to a plurality of secondary airways 62. In accordance with this preferred embodiment of the present invention, the major surfaces of dispensing grill 58 are approximately 45 cm long by 35 cm wide. Secondary airways 62 have a plurality of air-dispensing holes 64 through which air is injected into the water causing bubbles to form in conduit 52. Secondary airways 62 are typically formed from a rigid material such as a hard plastic. Holes 64 typically have a diameter of half a millimeter. Optionally, secondary airways 62 are formed from a flexible material which is supported by a rigid support structure, holes 64 being formed as very small slits through the surface of the flexible material. When the holes are formed as slits in the flexible material they general remain unclogged. In accordance with this preferred embodiment of the present invention, there are approximately 2000 holes 64 per dispensing grill 58. Holes 64 are substantially evenly spaced on dispensing grill 58. The typical spacing between holes 64 is in the order of the expected bubble diameter. It is not desirable to enhance coalescence of the bubbles. However, it is desirable to maximize the contact surface area between the air and the water. Therefore, the minimum practical distance between holes 64 is typically about 6 mm, which is 20% to 50% more than an expected bubble diameter. In general holes 64 are configures to cover a majority of dispensing grill 58. The term "covering" means at least 3,000 holes 64 per square meter. If holes 64 are not all disposed on a plane which is perpendicular to flow path 24, then the gaps between holes 64 should be assessed by projecting holes 64 onto a plane which is perpendicular to flow path 24. A plurality of openings 66 between secondary airways 62 allows the passage of water through dispensing grill 58, while holes 64 located on the secondary airways 62 supply the air bubbles at even distances. The width of each opening 66 is approximately the same as the width of each secondary airway 62. Both water and bubbles interweave to form a substantially uniform mixture that gradually increases its velocity towards the outlet. A majority, typically almost 100%, of the water flowing into airlift 22 passes through openings 66 of dispensing grill 58 between a majority, typically almost 100%, of holes 64. Dispensing grill 58 is typically detachable for maintenance purposes, allowing easy access to the holes 64, sparing the need to remove the whole of airlift 22 from the water.

Dispensing arrangement 50 includes a water evacuation port 68 (FIG. 2), which allows fast water evacuation from central airway 60 and secondary airways 62. Water which enters dispensing arrangement 50 when airlift 22 is inoperable, is evacuated from dispensing arrangement 50 via water evacuation port 68 when compressed air is reintroduced into dispensing arrangement 50. Compressed air pushes the water out of dispensing arrangement 50 until air flows through holes 64. The evacuation port is located below the level of holes 64 so that air will not escape through water evacuation port 68. Keeping the airways open allows even distribution of air through dispensing grill 58 creating an even "bubbly flow". The size and number of holes 64 is configured to ensure that water is evacuated from the airways without air escaping through water evacuation port 68. Water evacuation port 68 has a one-way valve which only allows water to exit dispensing arrangement 50 via water evacuation port 68. This feature is important in order to prevent soiled water from entering the airways when airlift 22 is inoperable and clogging holes 64 when pumping is resumed. Water evacuation port 68 extends almost to the bottom of aeration tank 14 to ensure even distribution of air in the system.

Bottom opening 56 is typically wholly or at least partially disposed lower than any part of sloping internal bottom surface 30. Therefore, aeration tank 14 is deeper than culture tank 12. This increased depth allows an efficient operation of airlifts 22. Conduit 52 has a substantially rectangular cross-section. The rectangular cross-section of conduit 52 allows an increase in the flow of water in airlift 22 without having to increase the length of conduit 52, which is a common requirement with prior art round cross-section airlifts. The rectangular cross-section also enables effective space utilization. Additionally, conduit 52 tapers towards top opening 54. The change in cross section area from bottom opening 56 to top opening 54 allows a gradual increase of flow speed inside airlift 22 saving friction losses especially at bottom opening 56, where introduced water undergoes a sudden change in speed. Conduit 52 is configured to direct momentum from the upward flow of the water in conduit 52 into flow path 16 of culture tank 12, by bending conduit 52 such that top opening 54 faces culture tank 12.

Figure 6:
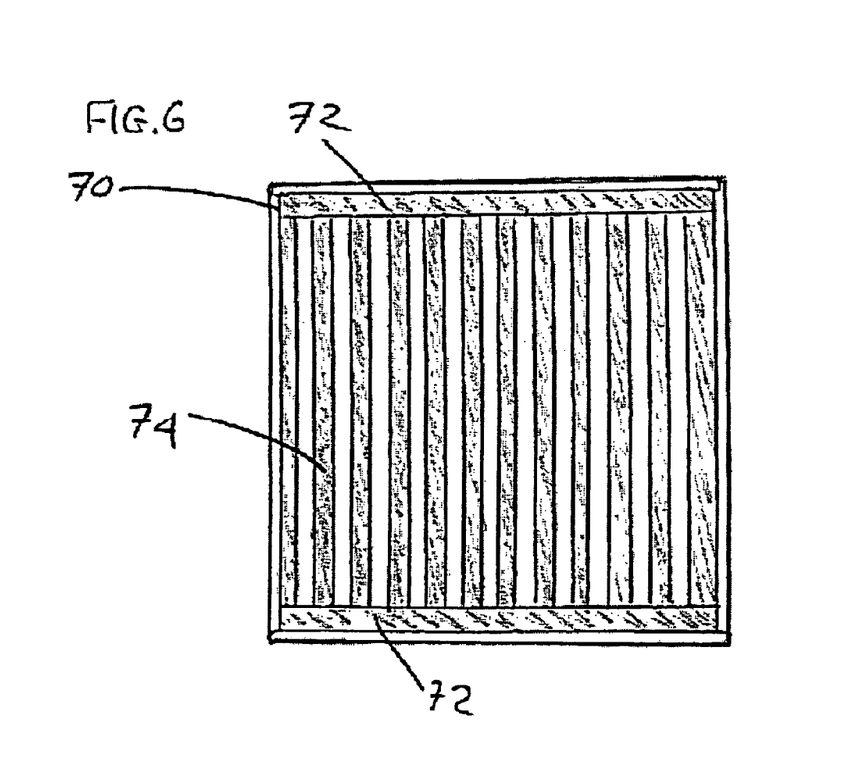
FIG. 6 is a top view of an adjustable choke for use with the aerated recirculated aquaculture system of FIG. 1.

Reference is now made to FIG. 6, which is a top view of an adjustable choke 70. Reference is also made to FIG. 2. By way of introduction, the main energy cost of aerated recirculated aquaculture system 10 is compressing air. Therefore, efficient use of compressed air means that the air bubbles which are produced should remain in conduit 52 as long as possible. Adjustable choke 70 is disposed within conduit 52 below and adjacent to dispensing grill 58. Adjustable choke 70 is configured to regulate the rate of water flow in conduit 52, thereby regulating the amount of aeration of the water. Adjustable choke 70 is formed as a grill having two side-supports 72 and a plurality of central elongated members 74. The width and spacing of elongated members 74 is configured to match the width and spacing of openings 66 of dispensing grill 58 (FIG. 5). Adjustable choke 70 is disposed, such that the direction of elongation of elongated members 74 is parallel to the direction of elongation of openings 66. Therefore, lateral movement of adjustable choke 70 with respect to dispensing grill 58 is able to control the water flow rate through conduit 52. It will be appreciated by those skilled in the art that arrangements performing a similar function to adjustable choke 70 can be disposed anywhere in conduit 52.

Figure 7A:
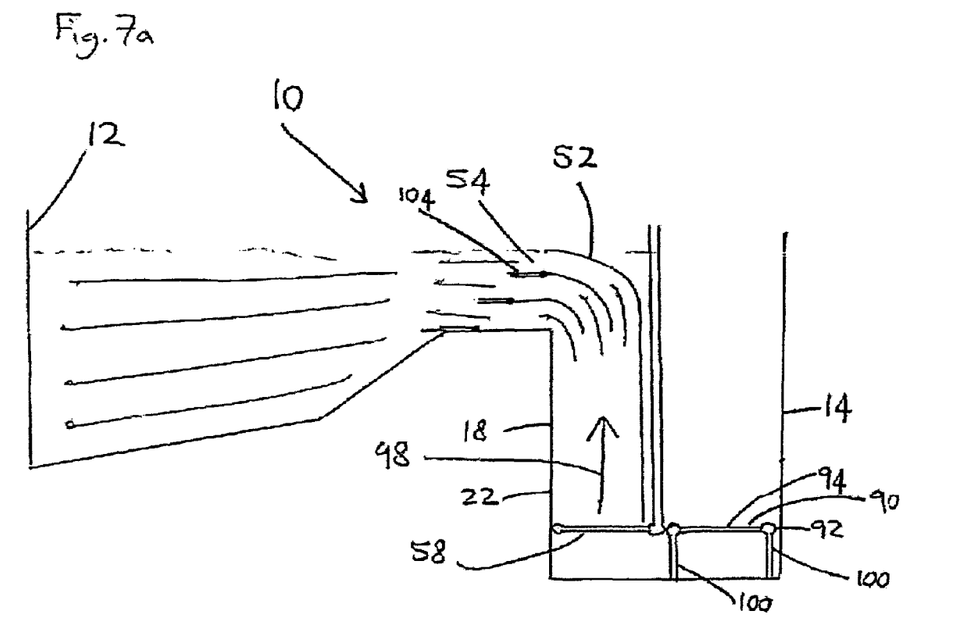
FIG. 7a is a cross-sectional view of the aerated recirculated aquaculture system of FIG. 1 that is constructed and operable in accordance with a most preferred embodiment of the present invention.
Figure 7B:
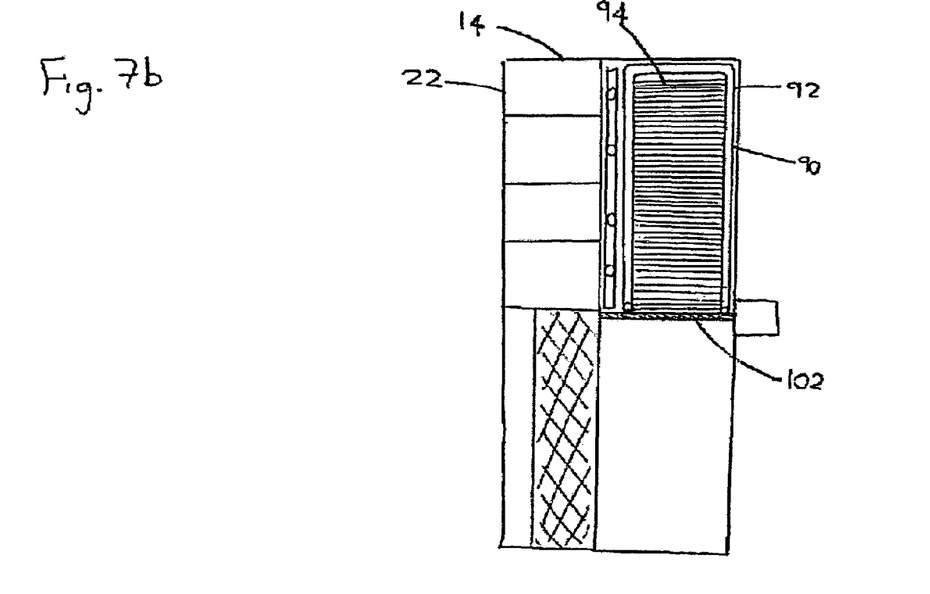

Reference is now made to FIG. 7a, which is a cross-sectional view of aerated recirculated aquaculture system 10 of FIG. 1 along line A-A that is constructed and operable in accordance with a most preferred embodiment of the present invention. In accordance with this most preferred embodiment of the present invention, top opening 54 of conduit 52 is substantially wholly disposed below a resting level of the water within culture tank 12. A "resting level" of the water is defined as the water level within culture tank 12 when aeration and circulation system 18 is inoperable and there is no "bubbly flow" creating different water levels in aerated recirculated aquaculture system 10. Airlift 22 in accordance with this most preferred embodiment does not have to do work to raise the water above the resting level and thereby saving lifting energy. Additionally, in accordance with this most preferred embodiment the cross-section of conduit 52 typically does not taper, as the reasons described above regarding tapering of the cross-section of conduit 52 with respect to FIG. 5 are generally not applicable here. Reference is also made to FIG. 7b, which is a plan view of aeration tank 14 in accordance with this most preferred embodiment. In accordance with this most preferred embodiment, an air dispensing arrangement 90 is disposed externally to conduit 52 within aeration tank 14. Air dispensing arrangement 90 is configured to regulate the rate of water flow in conduit 52, thereby regulating the amount of aeration of the water. Air dispensing arrangement 90 has a main airway 92, which supplies air to secondary airways 94. Secondary airways 94 have a plurality of holes (not shown) configured to inject air into the water in aeration tank 14 thereby creating bubbles which make the water lighter, reducing the density of the water outside of airlifts 22. This reduction in water density reduces the up flow effect in airlift 22, denoted by arrow 98, created by dispensing grill 58 of airlift 22. Therefore, the resulting speed of the water which is rising in airlift 22 is reduced by air dispensing arrangement 90. Therefore, air-dispensing arrangement 90 performs a similar function as adjustable choke 70 (FIG. 6) without the disadvantages of adjustable choke 70. Adjustable choke 70 limits the water flow by a sudden decrease in cross-sectional area which increases the water speed locally and thereby resulting in lost energy. Moreover, the air added to the water by air dispensing arrangement 90 is also used to aerate the water in airlifts 22. Therefore, air-dispensing arrangement 90 is a very efficient device for reducing the upward flow in airlifts 22. The water and air mixture inside conduit 52 should be lighter than the mixture outside of conduit 52 in aeration tank 14 to ensure that water still rises in conduit 52. Therefore, the number of holes per unit area of air dispensing arrangement 90 should be less than the number of holes per unit area of dispensing grill 58. This is typically achieved by adjusting the number of secondary airways 94 as well as the spacing of the holes on secondary airways 94. Air dispensing arrangement 90 is disposed at the same level as dispensing grill 58 within aeration tank 14. Air dispensing arrangement 90 is supported by a plurality of support legs 100. It should be noted that the whole of air dispensing arrangement 90 should be operated even when only one or some of airlifts 22 are operable. This is to ensure that the desired density ratio of air to water outside of the operable airlifts 22 is maintained so that the retention time of the water in the operable airlifts 22 is independent of the number of airlifts 22 in operation. Additionally, the water in aeration tank 14 is directed to flow down from the top of aeration tank 14 toward air dispensing arrangement 90. This is to prevent the water bypassing air-dispensing arrangement 90 by flowing below air dispensing arrangement 90. Therefore, a dividing wall 102 is disposed within aeration tank 14. The top of dividing wall 102 is disposed below the "resting" water level within aeration tank 14. Inspection tray 33 is disposed such that it does not block the water flow. Additionally, if not all airlifts 22 are being operated, the idle airlifts 22 need to be blocked to prevent back-flow of water from aeration tank 14, which could cause local short cuts in the flow pattern of water. Therefore, top opening 54 of conduit 52 includes one or more hinged flaps 104 made of buoyant material. Hinged flaps 104 automatically close top opening 54 when there is no flow from conduit 52.

Figure 8:
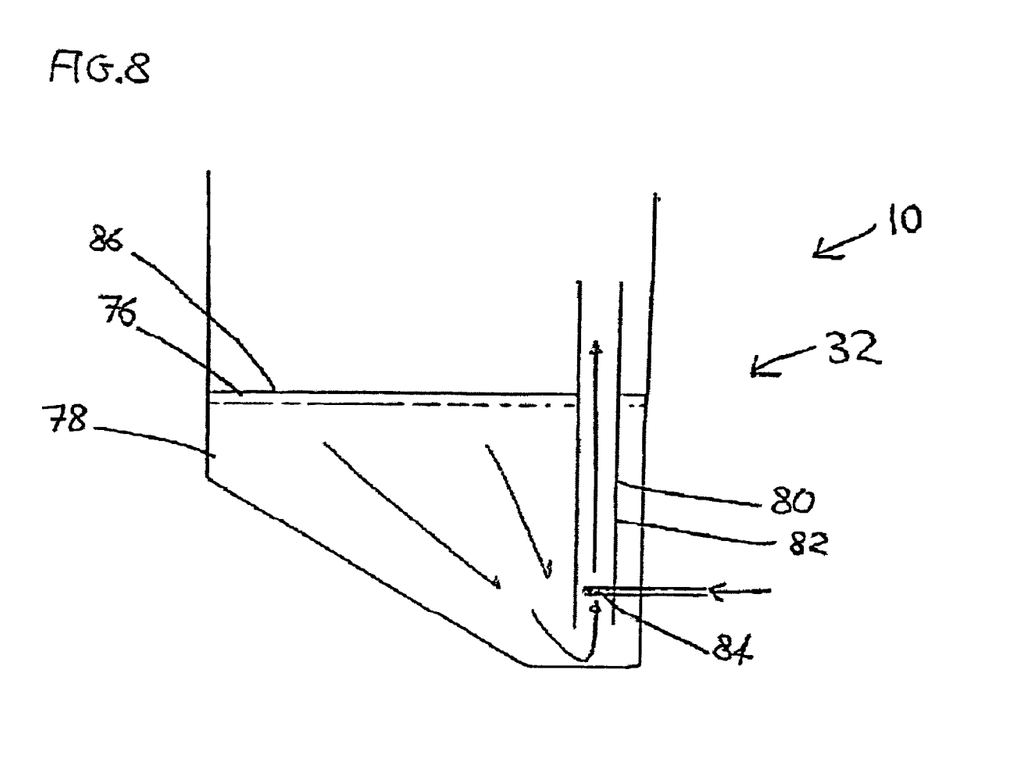
FIG. 8 is a cross-section view of the aerated recirculated aquaculture system of FIG. 1 through line C-C.

Reference is now made to FIG. 8, which is a cross-section view of aerated recirculated aquaculture system 10 of FIG. 1 through line C-C showing bottom collector 32. Reference is also made to FIG. 3. Bottom collector 32 has a collection opening 76 which is disposed adjacent to the lowest section of sloping internal bottom surface 30. In operation, a bottom layer of contaminated water flowing through flow path 16, which contains the highest concentration of heavy solids in the tank, is removed from culture tank 12 tank via collection opening 76 into a collection container 78 configured for collecting this bottom layer. Collection opening 76 is formed by an opening between collection container 78 and a collecting door 86 which is attached to the top of collection container 78 by at least one hinge 88. Collecting door 86 is typically a rectangular plate spanning substantially the whole width of sloping internal bottom surface 30. Collecting door 86 is made of a buoyant material in order to keep collecting door 86 open during normal operation. A calibrated device (not shown) ties down collecting door 86 to maintain the dimensions of collection opening 76. The height of collection opening 76 is typically set to about 1 centimeter above sloping internal bottom surface 30. Therefore, bottom collector 32 operates like a carpenter's wood plane, cutting off a layer of material which moves against an inclined wide blade. As described above, collecting door 86 is attached to collection container 78 by a hinge, allowing easy access to collection container 78 for inspection and maintenance. A pumping arrangement 80 removes the contents of collection container 78 to inspection tray 33 (FIG. 1). Pumping arrangement 80 pumps at a rate which is sufficient to ensure that the bottom layer of contaminated water flowing through flow path 16 is removed via collection opening 76. It should be noted that the pumping rate needs to be sufficient to remove the heavy solids traveling near the bottom of culture tank 12. Generally, the required pumping rate is equal to or higher than the product of the average cross-sectional water velocity in flow path 16 close to bottom collector 32 and the area of collection opening 76. Pumping arrangement 80 operates using an airlift apparatus including a conduit 82 and an air dispensing arrangement 84. The holes of dispensing arrangement 84 are disposed at the same level as holes 64 of dispensing grill 58 thereby allowing the use of a single compressed air supply. Therefore, a single compressor services each aerated recirculated aquaculture system 10 and an array of aerated recirculated aquaculture systems 10 with a single engine. Collection container 78 has a partially sharply slanted bottom surface, typically at least a 40% gradient, configured to cause solids to collect near to the inlet of pumping arrangement 80.

Figure 9A:
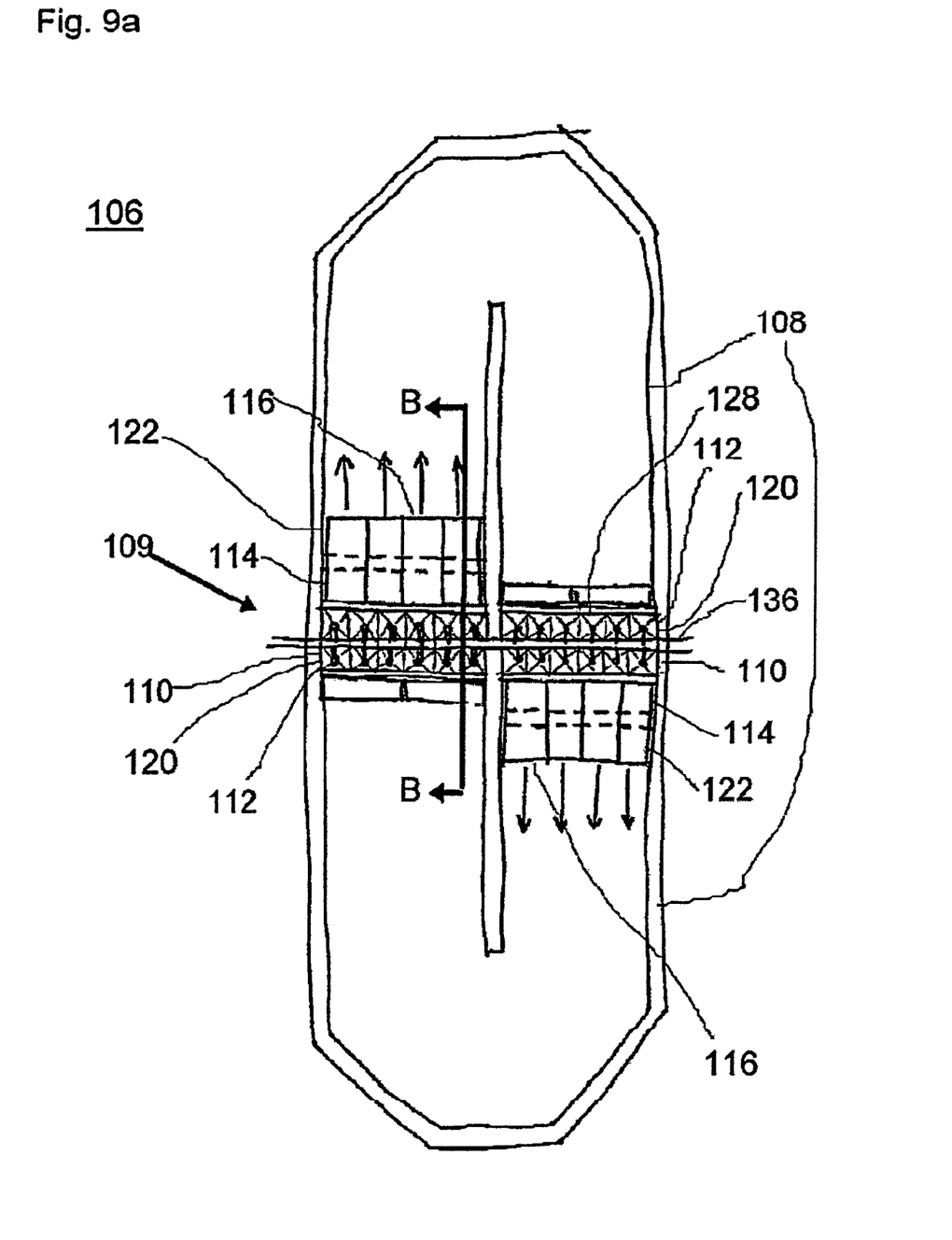
FIG. 9a is a plan view of an aerated recirculated aquaculture system that is constructed and operable in accordance with a second alternate embodiment of the present invention.
Figure 9B:
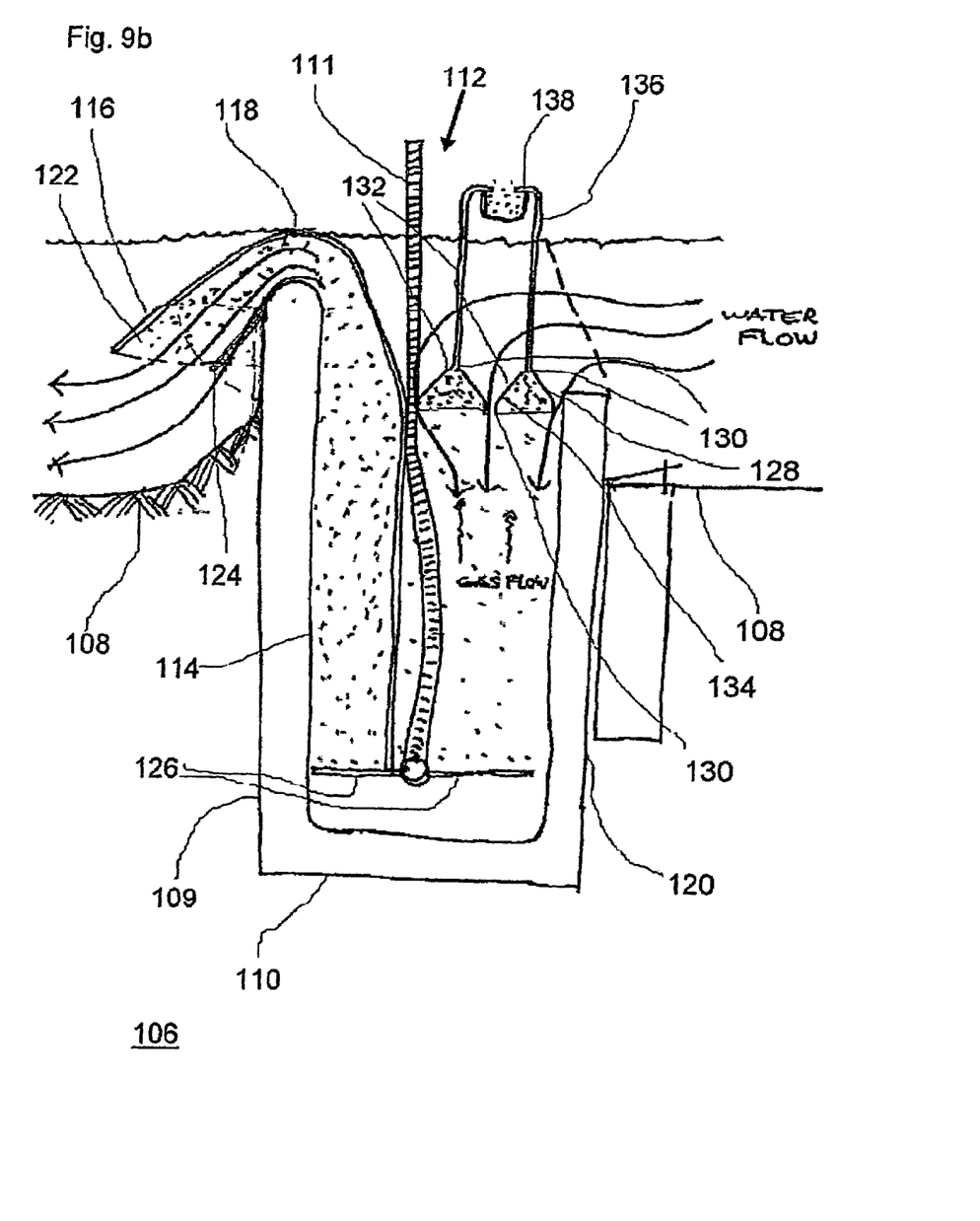

Reference is now made to FIGS. 9a and 9b. FIG. 9a is a plan view of an aerated recirculated aquaculture system 106 that is constructed and operable in accordance with a second alternate embodiment of the present invention. FIG. 9b is a cross-sectional view through line B-B of FIG. 9a Aerated recirculated aquaculture system 106 includes a combination of two culture tanks 108 attached to both sides of a single aeration tank arrangement 109. Aeration tank arrangement 109 is divided into two aeration tank sections 110, one section for each culture tank 108. Aeration tank sections 110 drive the water in opposite directions so that the water flows through a closed flow path by flowing through one aeration tank section 110, then through one culture tank 108, then through the other aeration tank section 110 and then through the other culture tank 108. This arrangement of culture tanks 108 and aeration tank sections 110 utilizes the whole width of aerated recirculated aquaculture system 106 for installation of airlifts while enabling the use of a single aeration tank arrangement 109. The airlift batteries in the new setup are serviced from the same air supply pipe 111, so the whole setup is cheaper to build.

Each aeration tank section 110 includes an aeration and circulation system 112. Each aeration and circulation system 112 includes four airlifts 114. Airlifts 114 are configured such that they are completely submerged below the water level in culture tanks 108.

Each aeration and circulation system 112 includes a front wing 116 installed at the outlet of airlifts 114. Front wing 116 forces the water flow to be released close to the bottom of culture tanks 108, thereby avoiding the need to create a sharp slope in culture tanks 108, as described above with reference to the other embodiments. In the other embodiments the steep slope in the culture tanks is needed to avoid turbulence and solids settlement near the bottom of the culture tank. This second alternate embodiment, using front wings 116, turbulence is created near the surface of the water in culture tanks 108 and therefore the bottom flow does not allow solids settlement. Front wing 116 is typically installed at an angle of about 45° creating an expanding cross section for the water flow with a downward general direction. Thus the water speed downward is gradually reduced and the bubble retention time increases because the bubbles tend to rise against the general direction of the flow. Eventually, the bubbles accumulate near the inner surface of front wing 116 are released through a plurality of vents 118 located near the top of airlifts 114. The use of front wing 116, instead of using a steep slope in the base of culture tanks 108 enhances gas transfer efficiency by about 15% compared to the other embodiments described above. Vents 118 are also used as indicators for operational efficiency of airlifts 114 at pumping water due to the gas spattering through vents 118.

As described above with reference to FIG. 7a, a submerged airlift installation allows the exchange of energy previously invested in lifting, with the energy needed to overcome higher buoyancy differences. In the embodiment described with reference to FIG. 7a, aeration tank 14 has two sections in the airlift sequence, a lifting section 22 and an entrance section adjacent to air dispensing arrangement 90. Enhanced aeration results because pre aeration of the water at the entrance section by air dispensing arrangement 90 creates a smaller average specific weight difference between the entrance and the lifting sections. This smaller difference creates a smaller driving force that slows the water velocity and therefore increases the water retention time in airlift 22.

The submerged installation together with front wing 116 adds another advantage to the previous sequence described with reference to FIG. 7a. The new arrangement of this second alternate embodiment has three different flow sections: (1) an entrance section 120, where the general water direction is downward and the bubbles rise against the water, therefore, the bubbles rise at a reduced speed compared to the same bubbles rising in calm water due to the counter-flow of the water; (2) a lifting section 114, where the general water direction is upward and the air bubbles travel upward, therefore the bubbles rise at an increased speed compared to the same bubbles rising in calm water; and (3) a wing section 122 where air and water move generally in opposite directions. This new sequence is balanced between cross section and air supply, thereby creating a general forward moving flow with no noticeable difference in water level throughout aerated recirculated aquaculture system 106.

Aerated recirculated aquaculture system 106 includes a check flap 124 installed at the end of each lifting section 114 allowing water to move only in the direction of culture tanks 108. Check flap 124 is substantially the same as hinged flaps 104 of FIG. 7a. Check flaps 124 are needed because each airlift 114 is generally part of a battery of airlifts 114 and the battery may be only partially operational. Check flaps 124 minimizes the water flow taking short cuts when the battery in only partially operational.

Each airlift 114 includes a porous dispenser 126 instead of dispensing grill 58 and air dispensing arrangement 90. Porous dispenser 126 is for example, but not limited to commercially available air stones. Alternatively, porous dispenser 126 includes a plurality of secondary airways including a combinations of small sections made of a porous brittle material installed on a pipe having a supply port to each porous section. The advantage of this combination allows for the minimum use of brittle material so that the overall size of each secondary airway is minimized in order to allow for water passage while reducing bubble size as compared with the bubble size produced by the drilled holes of dispensing grill 58 or air dispensing arrangement 90.

Entrance section 120 includes a foam collector and water dispenser arrangement 128. By way of introduction, proper operation of the airlift sequence of aerated recirculated aquaculture system 106 relies on an even mixture of bubbles and water. Foam collector and water dispenser arrangement 128 is a barrier with an even distribution of openings 130 that resembles an egg-packing tray. Foam collector and water dispenser arrangement 128 includes an array of upward facing truncated cones 132 and downward facing truncated cones 134 connected together or molded as a single unit. Each opening 130 of each upward facing truncated cone 132 is connected to a tube 136. Tubes 136 extend above the water level to a collecting trough 138. Downward facing truncated cones 134 allow water to enter entrance section 120. Water arriving from culture tank 108 is distributed through downward facing truncated cones 134 in order to form an even mixture of entering water with the rising bubbles formed by porous dispenser 126 of entrance section 120. Rising bubbles are forced into upward facing truncated cones 132. Collected foam is released into collecting trough 138 via tubes 136. As described above, cost savings are also expected due to aeration tank arrangement 109 being shallower. Aeration tank sections 110 are designed to bend the aeration path through 3 sections (entrance section 120, airlifts 114 and wing section 122) thereby elongating the water path while using less height. In fact, it has been demonstrated experimentally that the bottom of culture tanks 108 and aeration tank arrangement 109 can be at the same level without compromising aeration efficiency.

It will be appreciated by persons skilled in the art that the present invention is not limited to what has been particularly shown and described hereinabove. Rather, the scope of the present invention includes both combinations and sub-combinations of the various features described hereinabove, as well as variations and modifications thereof that are not in the prior art which would occur to persons skilled in the art upon reading the foregoing description.

What is claimed is:

1. An aerated recirculated aquaculture system comprising:
   (a) a culture tank for housing live a aquaculture, said culture tank having a barrier, wherein said barrier defines a first flow path: and
   (b) an aeration tank including an aeration and circulation system including an aeration device configured to aerate water, said aeration tank defining a second flow path, said first flow pat and said second flow path at least partially defining a substantially closed flow path sequentially passing through said culture tank and said aeration tank, said aeration and circulation system being configured to circulate the water around said substantially closed flow path;
   wherein said barrier is situated in said culture tank substantially perpendicular to a common adjoining side of said culture tank and said aeration tank, said barrier situated so as to ensure that a lowest oxygenated water and a highest carbon-dioxide-saturated water, in said first flow path, returns to said aeration tank; and
   wherein said aeration device includes an airlift pump having a dispensing arrangement and a conduit, said conduit having a top opening and a bottom opening, said dispensing arrangement having a plurality of holes configured for enabling injection of air into the water causing a plurality of bubbles to form in said conduit, said holes substantially covering a majority of said dispensing arrangement, said dispensing arrangement having at least one opening configured to allow passage of the water through said dispensing arrangement, such that a majority of the water flowing in said second flow path passes through said dispensing arrangement between a majority of said holes.

2. The system of claim 1, wherein said dispensing arrangement includes a porous material.

3. The system of claim 1, wherein said conduit is configured to direct momentum from the upward flow of the water in said conduit into said first flow path of said culture tank.

4. The system of claim 1, wherein:
   (a) said culture tank has an internal bottom surface; and
   (b) at least part of said bottom opening of said conduit is disposed lower than any part of said internal bottom surface.

5. The system of claim 1, wherein said conduit has a substantially rectangular cross-section.

6. The system of claim 1, wherein said conduit tapers towards said top opening.

7. The system of claim 1, wherein said holes are spaced substantially evenly among said dispensing arrangement.

8. The system of claim 1, wherein said airlift pump includes an adjustable choke configured to regulate the rate of water flow in said conduit, thereby regulating the amount of aeration of the water.

9. The system of claim 1, wherein said airlift pump includes a second air dispensing arrangement disposed externally to said conduit, said second dispensing arrangement being configured to regulate the rate of water flow in said conduit, thereby regulating the amount of aeration of the water.

10. The system of claim 9, further comprising a dispensing and foam collecting arrangement disposed above said second air dispensing arrangement, said dispensing and foam collecting arrangement configured for:
    (a) distributing water evenly among bubbles rising from said second air dispensing arrangement; and
    (b) collecting foam associated with said bubbles rising from said second air dispensing arrangement.

11. The system of claim 10, wherein said dispensing and foam collecting arrangement includes an array of downward facing truncated cones interspersed with an array of upward facing truncated cones.

12. The system of claim 1, wherein said top opening is substantially wholly disposed below a resting level of the water within said culture tank.

13. The system of claim 12, further comprising a front wing disposed adjacent to said top opening, a majority of said front wing being disposed in said culture tank below said resting level, said front wing being configured to direct momentum from the upward flow of the water in said conduit into said first flow path of said culture tank.

14. The system of claim 13, further comprising vent holes disposed between said front wing and said top opening, said vent holes configured to allow escape of gas.

15. The system of claim 1, wherein said culture tank has a first sloping internal bottom surface adjacent to said top opening of said conduit and a second sloping internal bottom surface, said first sloping internal bottom surface being steeper than said second sloping internal bottom surface.

16. The system of claim 1, further comprising a separation arrangement disposed between said culture tank and said aeration device substantially at the end of said first flow path, said separation arrangement being configured to separate water leaving said culture tank to prevent clogging of said aeration device.

17. The system of claim 1, further comprising a bottom collector having a collection opening, said culture tank having an internal bottom surface, said collection opening being disposed adjacent to said internal bottom surface such that, in operation a bottom layer of contaminated water flowing through said first flow path is removed from said culture tank via said collection opening.

18. The system of claim 17, wherein:
    (a) said bottom collector has a collection container configured for collecting said bottom layer; and
    (b) said bottom collector has a pumping arrangement configured to remove said bottom layer from said collection container, said pumping arrangement being configured to pump at a rate which is sufficient to ensure that said bottom layer is removed from said first flow path via said collection opening.

19. The system of claim 18, wherein said collection container has an at least partially slanted bottom surface configured to cause solids to collect near to said pumping arrangement.

20. The system of claim 18, wherein said pumping arrangement operates using an airlift apparatus.

* * * * *

UNITED STATES PATENT AND TRADEMARK OFFICE
CERTIFICATE OF CORRECTION

PATENT NO. : 7,381,326 B2
APPLICATION NO. : 10/912143
DATED : August 3, 2008
INVENTOR(S) : Israel Haddas

It is certified that error appears in the above-identified patent and that said Letters Patent is hereby corrected as shown below:

Claim 1, col. 13 should be corrected as follows:

Line 20: change "pat" to --path--

Signed and Sealed this

Second Day of September, 2008

JON W. DUDAS
*Director of the United States Patent and Trademark Office*

UNITED STATES PATENT AND TRADEMARK OFFICE
CERTIFICATE OF CORRECTION

PATENT NO. : 7,381,326 B2  Page 1 of 1
APPLICATION NO. : 10/912143
DATED : June 3, 2008
INVENTOR(S) : Israel Haddas It is certified that error appears in the above-identified patent and that said Letters Patent is hereby corrected as shown below:

Claim 1, col. 13 should be corrected as follows:

Line 20: change "pat" to --path--

This certificate supersedes the Certificate of Correction issued September 2, 2008.

Signed and Sealed this

Thirtieth Day of September, 2008

JON W. DUDAS
*Director of the United States Patent and Trademark Office*